United States Patent [19]
Ochiai

[11] Patent Number: 5,208,805
[45] Date of Patent: May 4, 1993

[54] METHOD FOR CONTROLLING THE COMMUNICATION PRIORITY OF COMMUNICATION PACKETS AND EXCHANGE EMPLOYING THE METHOD

[75] Inventor: Tamiya Ochiai, Shiroyama, Japan

[73] Assignee: Kabushiki Kaisha Toshiba, Kawasaki, Japan

[21] Appl. No.: 634,353

[22] Filed: Dec. 26, 1990

[30] Foreign Application Priority Data

Dec. 27, 1989 [JP] Japan ................... 1-343478

[51] Int. Cl.⁵ .............................................. H04Q 11/04
[52] U.S. Cl. ...................................... 370/60; 370/85.6
[58] Field of Search ..................... 370/60, 60.1, 94.1, 370/94.2, 85.6; 340/825.5, 825.51

[56] References Cited

U.S. PATENT DOCUMENTS

| | | |
|---|---|---|
| 4,769,810 | 9/1988 | Eckberg, Jr. et al. ............ 370/94.1 |
| 4,922,485 | 5/1990 | Quinquis et al. ................. 370/60 |
| 4,942,569 | 7/1990 | Maeno .............................. 370/60 |
| 4,953,157 | 8/1990 | Franklin et al. ................. 370/60 |

Primary Examiner—Douglas W. Olms
Assistant Examiner—Hassan Kizou
Attorney, Agent, or Firm—Finnegan, Henderson, Farabow, Garrett and Dunner

[57] ABSTRACT

Packet communication is effected by variably setting a control priority on the basis of a call priority value set as a fixed value at the time of call setting as well as a packet priority value variably designated by a transmission packet during communication. While a packet priority is being designated in correspondence with the degree of importance of the packet, the relevant packet can be communicated with a truly desirable priority corresponding to that degree of importance, thereby contributing to the effective utilization of a memory resource in an exchange and a trunk transmission zone.

15 Claims, 13 Drawing Sheets

CALL PRIORITY TABLE (302)
TERMINAL i, OR TRUNK j

| CHANNEL NUMBER | n BITS |
|---|---|
| 0 | P0 CALL PRIORITY VALUE |
| 1 | P1 CALL PRIORITY VALUE |
| 2 | ⋮ |
| ⋮ | |

RANGE OF PRIORITIES WHICH A PACKET
FOR EACH CHANNEL CAN ASSUME

+ PACKET PRIORITY (303: ADDER)

— CALL PRIORITY

− PACKET PRIORITY (303: SUBSTRACTOR)

CALL PRIORITY TABLE (3021)
FOR EACH TERMINAL I, TRUNK J

CHANNEL NUMBER

| | | | |
|---|---|---|---|
| 0 | Px | Py | Pz |
| 1 | | | |
| ⋮ | | | |

FIG. 10

CALL PRIORITY CONVERSION TABLE (402)

| PACKET PRIORITY VALUE | CALL PRIORITY VALUE |
|---|---|
| d0 | Px |
| d1 | Py |
| d2 | Pz |
| m BITS | n BITS |

FIG. 11

CALL MESSAGE

COMMUNICATION PACKET

METHOD FOR CONTROLLING THE COMMUNICATION PRIORITY OF COMMUNICATION PACKETS AND EXCHANGE EMPLOYING THE METHOD

BACKGROUND OF THE INVENTION

1. Field of the Invention

The present invention relates to a method and an apparatus for controlling the priority of communication packets which are applied to exchanges based on a connection-type communication method in which communication paths and communication channels are determined in advance on the basis of call information prior to commencing communication between terminals, such as packet exchanges and asynchronous-transmission-mode exchanges.

2. Description of the Related Art

As is known, in packet switching systems and asynchronous-transmission-mode switching systems, packet communication is conducted after communication paths and communication channels are determined in advance on the basis of call information prior to commencing communication between terminals.

In such switching systems based on a connection-type communication method, call priority values are set by connection processing with respect to calls from a plurality of terminals, and the control of instantaneousness or abandonment concerning subsequent packet communication is conducted on the basis of the call priority values.

For instance, a conventional packet switching system of this type is so arranged that a plurality of terminals are accommodated in one packet exchange, and this packet exchange is connected to an adjacent packet exchange via a trunk.

Here, a plurality of terminals are similarly accommodated in the adjacent exchange as well.

Now, it is assumed that a communication request has been made from an arbitrary terminal accommodated in an exchange to a terminal accommodated in an adjacent terminal.

In this case, a call message is delivered from the transmission-side terminal to a control unit in the subject exchange.

Here, the control unit secures a communication path, a communication channel, and the like between the transmission-side terminal and the reception-side terminal through control which will be described later, and delivers a call message to the adjacent exchange vial a call signal line in the trunk in accordance with path information for each preset destination.

With respect to the adjacent exchange as well, the control unit secures a communication path and a channel leading to the destination terminal, and delivers the aforementioned call message to this destination terminal.

Subsequently, in a case where packet communication is conducted between the two terminals, the transmission-side terminal transmits a packet to the memory of the subject exchange via a data line, and transmits the packet to, for instance, a trunk interface via a communication path set by the call message.

On the other hand, the adjacent exchange also continues to send packets from a trunk interface of its own to a destination terminal through the memory via the data line.

In the packet communication based on the connection-type communication method of this type, a call message of a format configuration such as the one shown in FIG. 15 is employed.

This call message comprises destination number information expressed by a destination exchange number and a destination terminal number; a call priority value (n bits) expressing a communication priority value between the terminals; a channel number captured for a terminal line and a trunk conforming with information on a path to a destination number of the packet transmitting side; and other additional information expressing communication attributes and the like of a terminal.

When this call message is received by exchanges within the packet switching system, their control units determine whether the call message is reception from a terminal or reception from a transit trunk.

Then, if it is reception from the terminal, a call priority value in the call message is written in a storage area for the captured channel value in the call message, the storage area belonging to a relevant terminal number area of a call priority table which will be described later.

On the other hand, if it is reception from a transit trunk, a call priority value in the call message is written in a storage area for the captured channel value in the call message, the storage area belonging to a relevant trunk number area in the call priority table.

Subsequently, a path where packets due to that call conforming with the information on a path to the destination number is written in a path information section of a packet path table, a vacant channel is captured from a trunk or terminal being presented as path information, and its channel value is stored in a channel information section of a packet table and a captured channel field in the call message. A call message is then transmitted to an exchange adjacent in terms of the path information.

If this processing is repeatedly executed from a beginning terminal to an ending terminal, the packet path and the priority of that call is set.

In addition, a conventional communication packet communicated by the connection-type communication method of this type has had a format configuration such as the one shown in FIG. 16.

This communication packet comprises an expression of a channel number captured at the time of call setting and an expression of communication information of a terminal, and communication is effected between a terminal and an exchange or between two exchanges on the basis of this format.

In the above-described packet switching system, the communication packet is subjected to so-called priority control concerning instantaneousness or abandonment at the time when the communication packet passes each exchange located on its communication path.

To realize this priority control, a memory is provided in the exchange, and a control unit therefor comprises a priority control unit, a buffer, a packet path table, a buffer busy-detecting unit, and so on.

Furthermore, the priority control unit among them comprises a packet disassembly unit, a call priority table, a comparator, a data bus switch, and the like.

Upon receipt of a reception packet via a packet reception bus, the priority control unit in the memory extracts a channel number in the packet by means of the packet disassembly unit, and inputs this channel number signal to the call priority table.

At that time, the reception packet itself is transferred to the buffer in the memory via the data bus switch.

In the call priority table, at the time of setting a call effected prior to that packet reception, a call priority value (n bits) is set for each terminal and trunk in correspondence with each channel.

In this state, if a channel number signal is inputted from the packet disassembly unit, the call priority value of the reception packet is retrieved on the basis of this channel number signal, and its result is notified to the comparator as a call priority signal.

The comparator makes a comparison between the call priority signal of the reception packet with a lowest priority signal in the buffer.

The aforementioned data bus switch interposed between the packet disassembly unit and the buffer is subjected to opening/closing control as a result of comparison by the comparator and as a result of detection by the busy detecting unit as to whether or not the buffer is busy.

As a specific operation, when the buffer is busy, if the result of comparison by the comparator is:

Call priority signal of the reception packet < lowest priority signal in the buffer, then the data bus switch is held open, and the reception packet is abandoned without being stored in the buffer.

In contrast, when the buffer is busy, if the result of comparison by the comparator is:

Call priority signal of the reception packet ≧ lowest priority signal in the buffer, then the data bus switch is closed, and the reception packet is stored in the buffer.

As a result of this processing, a reception packet whose call priority set at the time of call setting by connection processing is higher, among the reception packets, is preferentially stored in the buffer which is in the busy state.

The reception packets thus stored in the buffer are subsequently read out sequentially and are transmitted to the transmission data line, with the result that the packets subject to communication are communicated preferentially beginning with those whose priority values are higher.

In the priority control in this priority control unit, the call priority values for determining the priority of the communication packets have been set as fixed values by connection processing at the time of call setting, as described above.

Namely, in a conventional switching system of this type, the priority control of communication packets has been conducted on the basis of call priority values set as fixed values at the time of call setting.

Meanwhile, among the items of communication information between terminals subject to this priority control, information which is important and information which is not very important are generally mixed.

According to the above-described conventional priority control method, even in cases where communication information between terminals which has relatively high importance and that which does not are mixed, it has been unavoidable to effect communication during a period of call connection on the basis of the call priority value set as a fixed value at the time of call setting.

For this reason, with the conventional switching system of this type, even information which is not very important is compelled to undergo packet communication processing in accordance with a high priority, thereby hindering the effective utilization of the memory in the packet exchange and the trunk transmission zone.

SUMMARY OF THE INVENTION

Accordingly, an object of the present invention is to provide a method for controlling the priority of communication packets which makes it possible to effect information communication processing with a truly preferable priority corresponding to the degree of importance of communication information between terminals without being governed by a call priority set as a fixed value at the time of call setting.

In addition, another object of the present invention is to provide a method for controlling the priority of communication packets which is capable of effecting a variable setting of a truly preferable priority concerning communication information from a terminal without hindering the information communication of the other terminals.

Furthermore, still another object of the present invention is to provide a method for controlling the priority of communication packets which is capable of maintaining a proper operation as a system even in cases where an error has occurred in a priority setting information field in a communication packet.

A further object of the present invention is to provide an apparatus for controlling the priority of communication packets which is capable of effecting information communication with a truly preferable priority corresponding to the importance of that communication information even during communication after call setting, thereby making it possible to effectively utilize a memory resource in an exchange and a trunk transmission zone.

A still further object of the present invention is to provide an apparatus for controlling the priority of communication packets which is capable of simply effecting a variable setting of a truly preferable priority concerning communication processing of communication information between terminals.

A further object of the present invention is to provide an apparatus for controlling the priority of communication packets which is capable of effecting a variable setting of a truly preferable priority without increasing the burden of processing by the internal components of an exchange even at the time of communication when there is an extremely large difference in the priority of communication information between terminals.

To these ends, in accordance with one aspect of the present invention there is provided a method for controlling the priority of communication packets, comprising the steps of: conducting connection processing for determining in advance a communication path and a communication channel between a calling terminal and a called terminal on the basis of call information from the calling terminal in an exchange interposed in a communication path prior to commencing packet communication; setting a call priority value presented in the call information from the calling terminal, the setting being effected with respect to each connection at the time of connection processing; setting a packet priority value as a priority value for each packet in a relevant communication packet during packet communication; setting a control priority value on the basis of the call priority value and the packet priority value; and conducting priority control of the communication packet on the basis of the control priority value.

In accordance with another aspect of the invention, the step of setting the control priority value variably sets the control priority value on the basis of the call priority value and the packet priority value, and sets an upper limit to the control priority value by restricting a range of variation of the control priority value in correspondence with a range of variation of the packet priority value.

In accordance with still another aspect of the invention, the step of setting the control priority value includes the step of variably setting the control priority value on the basis of the call priority value and the packet priority value, the step of setting an upper limit to the control priority value, and the step of providing protection so that, when an error has occurred in information indicating the packet priority value in the communication packet, the control priority value for the communication packet will not deviate the upper limit.

In accordance with a further aspect of the invention there is provided an apparatus for controlling the priority of communication packets, comprising: connection processing means for determining in advance a communication path and a communication channel between a calling terminal and a called terminal on the basis of call information from the calling terminal in an exchange interposed in a communication path prior to commencing packet communication; call priority value setting means for setting a call priority value presented in the call information from the calling terminal, the setting being effected with respect to each connection at the time of connection processing; packet priority value setting means for variably setting, even during call connection, a packet priority value as a priority value for each packet in a relevant communication packet during packet communication; control priority value setting means for setting a control priority value concerning the communication packet on the basis of the call priority value and the packet priority value; and priority controlling means for effecting priority control of instantaneousness or abandonment with respect to communication information between the calling terminal and the called terminal on the basis of the control priority value set by the control priority value setting means.

In accordance with a still further aspect of the invention, the control priority value setting means comprises a circuit for conducting addition or subtraction with respect to the call priority value and the packet priority value.

In accordance with a further aspect of the invention, the control priority value setting means comprises a control priority value conversion table for selecting and outputting a control priority value corresponding to the relationship between the call priority value and the packet priority value that are inputted in conjunction with communication, from among a plurality of control priority values that are registered in advance.

In accordance with a further aspect of the invention, the control priority value setting means comprises a call priority value conversion table for selecting and outputting any one of a plurality of call priority values having discrete values as the control priority value in correspondence with the packet priority value of the packet being communicated.

Thus, in the method of controlling the priority of communication packets in accordance with the present invention, the arrangement provided is as follows: A variable packet priority value is set in a field of the packet for each communication packet. During communication, a final control priority value of the communication packet is set on the basis of both the call priority value determined as a fixed value at the time of call setting and the packet priority value. The priority control of the communication packet is conducted on the basis of the control priority value.

For this reason, by designating the packet priority value in correspondence with the degree of importance of communication information between terminals, the control priority value can be variably set with that degree of importance reflected. As a result of conducting priority control using this control priority value, communication processing can be effected without being governed by the call priority set as a fixed value at the time of call setting, and with a truly desirable priority corresponding to the degree of importance between the terminals.

In addition, in the present invention, at the time of setting a final control priority value for a communication packet by incorporating both the call priority value and the packet priority value, the range of variation of the packet priority is restricted so as to restrict below a fixed level the range of variation of the control priority value of the communication information of the terminal which is set finally. Accordingly, the present invention contributes to overcoming the drawback that only the control priority value of the communication information of a certain terminal is excessively large, hampering preferential communication information of communication between the other terminals.

Thus, by setting an upper limit to the control priority value, in a case where, for instance, an error has occurred in packet priority information in the communication packet, it is possible to conduct control such as setting a final control priority value of this communication packet uniformly below the aforementioned limit.

As a result, even when an error has occurred to the packet priority information in the communication packet, it is possible to maintain proper communication as a system while providing protection so that the range of the control priority that can vary depending on the call priority and the packet priority will not deviate from the upper limit.

In addition, the apparatus for controlling the priority of communication packets in accordance with the present invention is arranged such that, in order to conduct priority control of communication packets which jointly uses a call priority value which is set as a fixed value at the time of call setting and a packet priority value set variably for each communication packet during packet communication, a circuit for determining a final control priority value for packet communication on the basis of the call priority value and the packet priority value is provided as a priority control unit within the exchange.

This control priority determining circuit may comprise, for instance, a circuit for conducting addition or subtraction with respect to the call priority value set at the time of call setting and the packet priority value in the reception packet. Hence, it is possible to allow communication information between terminals to be provided with a range of priorities in correspondence with the result of addition or subtraction involving the call priority value and the packet priority value.

In other words, in the present invention, among items of communication information to be effected between terminals, information which is desired to be communicated preferentially is communicated from the terminal as a packet having a high priority value, and information which need not be communicated preferentially is communicated as a packet having a low priority value. As a result, it is possible to vary the priority of the packet being communicated, in correspondence with the degree of importance of information from the terminal.

Consequently, it is possible to conduct communication processing with a truly desirable priority in correspondence with the degree of importance of communication information between terminals without being governed by the call priority value given as a fixed value, thereby making it possible to effectively utilize a memory resource inside the exchange and a trunk transmission zone.

In addition, in the present invention, as another example of the configuration of the aforementioned control priority determining circuit, a plurality of control priority values are registered in advance in correspondence with the relationship between the call priority value and the packet priority value, a control priority conversion table is utilized which selectively outputs a corresponding control priority value on the basis of the call priority value and the packet priority value that are inputted in actual communication.

By virtue of this configuration, as compared with a case here the control priority determining circuit is realized by an adder or a subtractor, it is possible to alleviate processing for determining a final control priority value.

Furthermore, as another example of the configuration of the control priority determining circuit in accordance with the present invention, a plurality of call priority values may be discretely set in advance in the call message from a terminal, and a call priority conversion table may be used which selectively outputs any one of the call priority values in accordance with the value of the packet priority during packet reception.

Thus, by utilizing any of the call priority values selected from the call priority conversion table as a control priority value, discrete control priorities can be allotted to items of communication information between terminals.

Accordingly, in this case, it is possible to variably set the control priorities to a wide permissible range without providing a large packet priority information field. Particularly in the priority control in which there is an extremely large difference in the priority of communication information between terminals, this arrangement is useful in alleviating a processing burden imposed on the internal components of the exchange.

The above and other objects, features and advantages of the present invention will become more apparent from the following detailed description of the invention when read in conjunction with the accompanying drawings.

BRIEF DESCRIPTION OF THE DRAWINGS

FIG. 10 is a diagram illustrating an example of a stored content of a call priority table 3021 in a priority control unit 2042 shown in FIG. 9;

FIG. 11 is a diagram illustrating an example of a stored content at a timing of a call priority conversion table 402 in the priority control unit 2042 shown in FIG. 9;

DESCRIPTION OF THE PREFERRED EMBODIMENTS

Referring now to the accompanying drawings, a detailed description will be given of the embodiments of the present invention.

Figure 1:
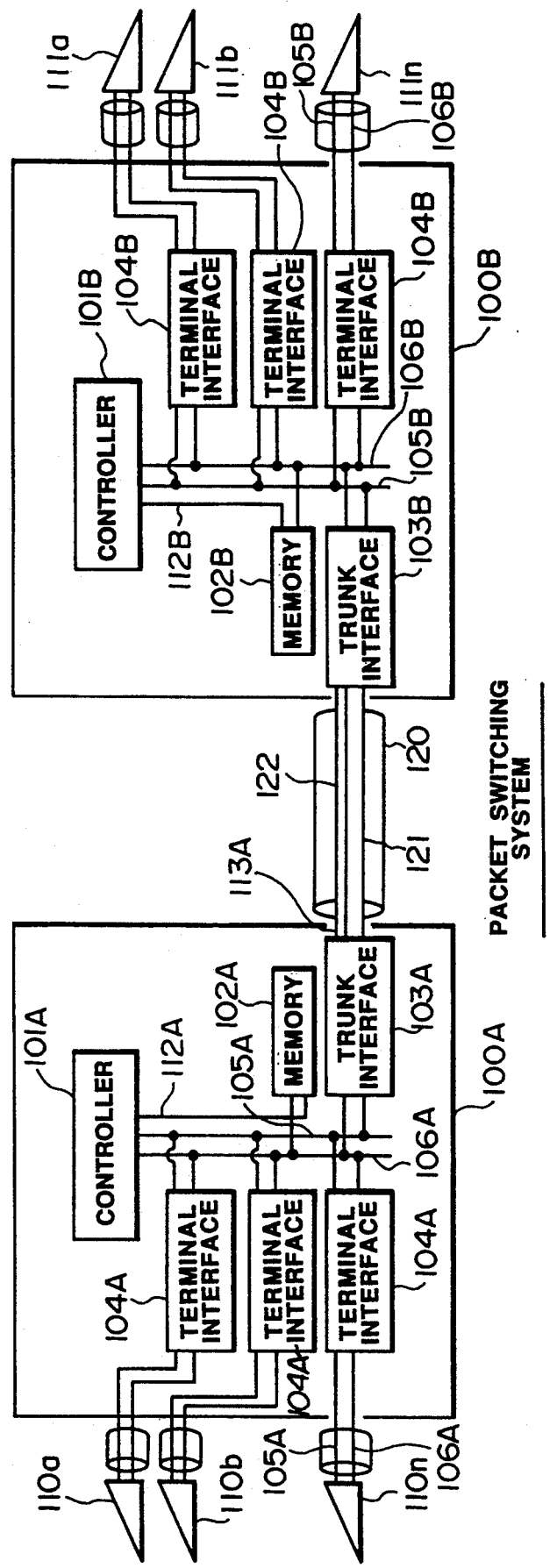
FIG. 1 is a system configuration diagram of a packet exchanging system to which a method for controlling the priority of communication packets in accordance with the present invention is applied.

FIG. 1 shows a schematic configuration of a packet switching system in accordance with an embodiment of the present invention.

Figure 2:
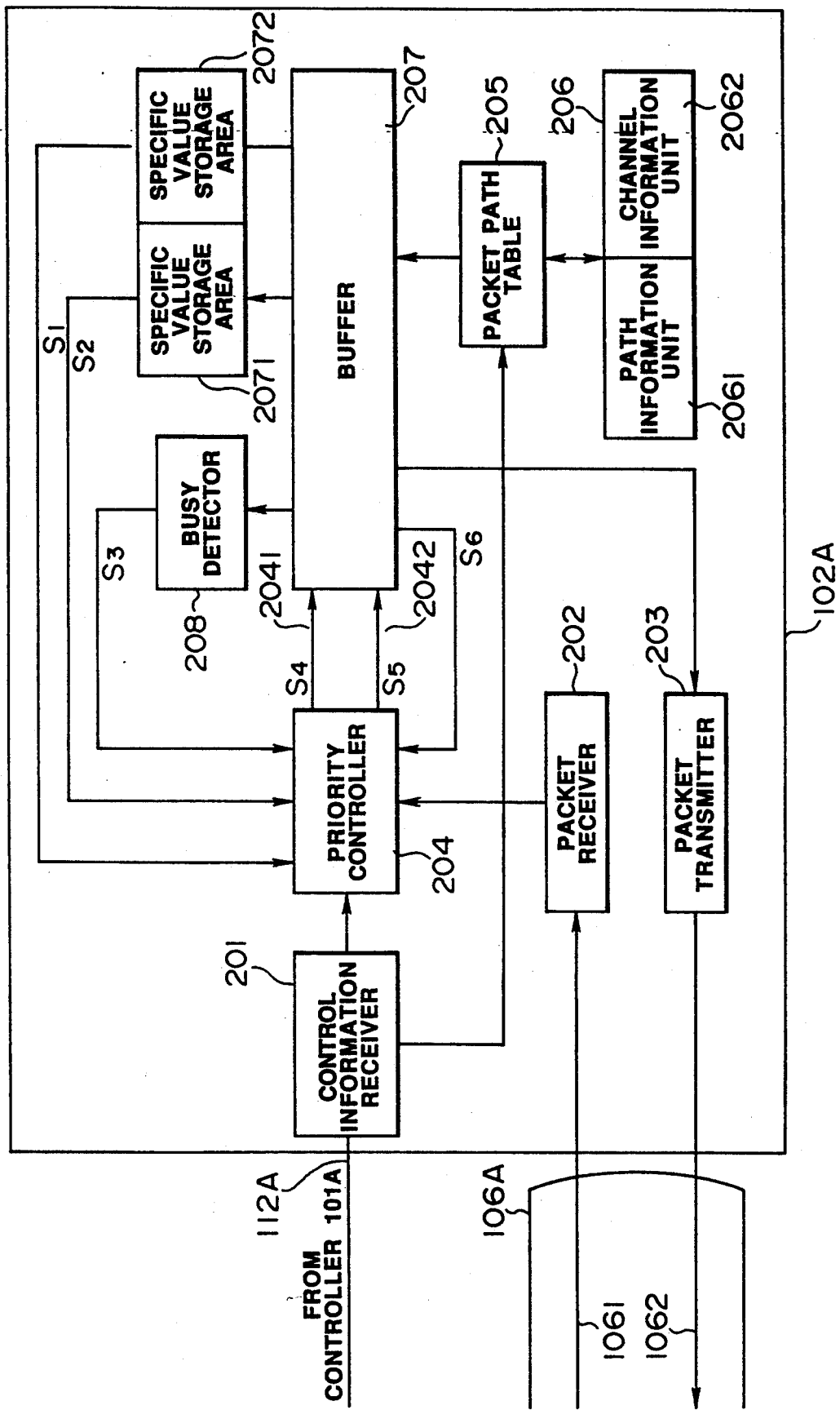
FIG. 2 is a block diagram illustrating a configuration of a memory 102A of a packet exchange 100A shown in FIG. 1.

A memory 102A in a packet exchange 100A of a packet switching system in accordance with the present invention has a configuration such as the one shown in FIG. 2.

Figure 3:
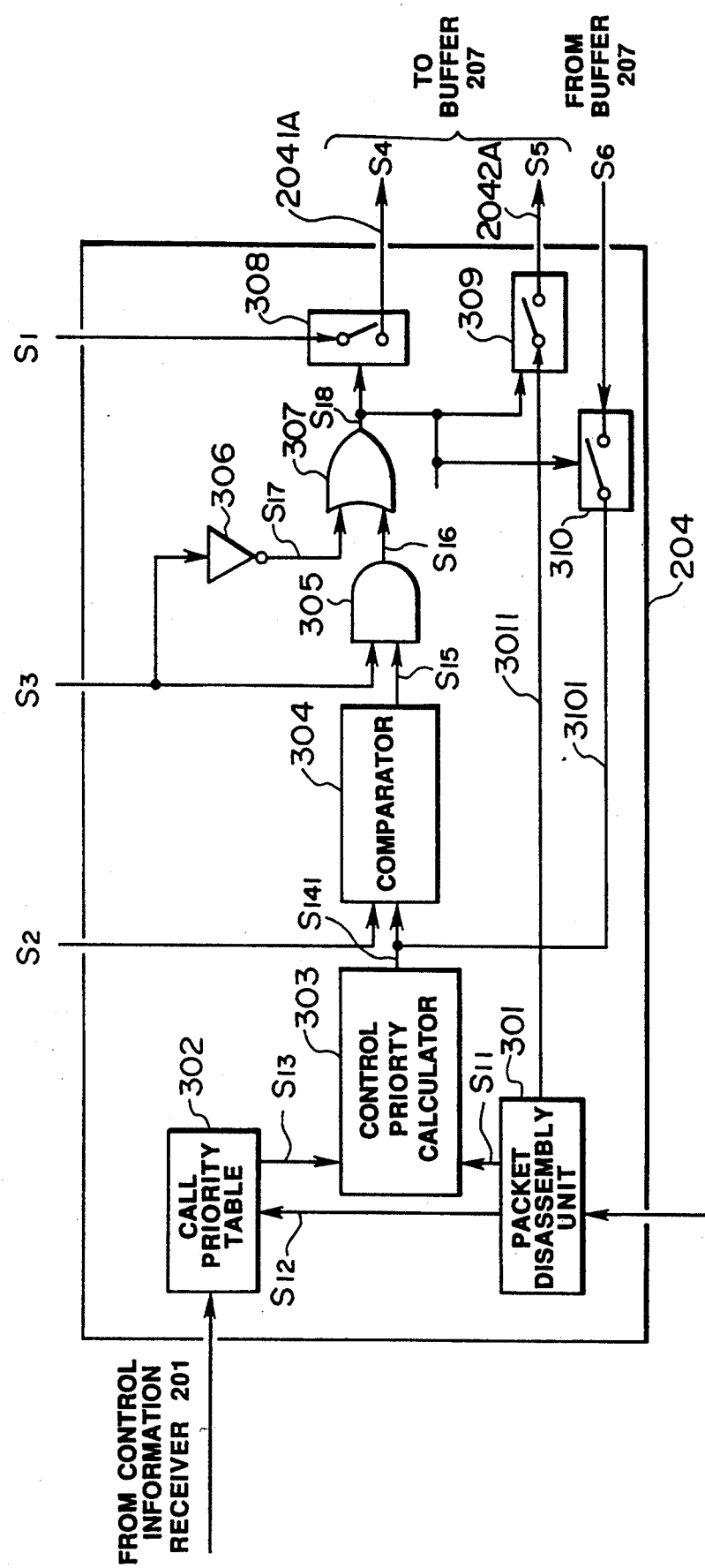
FIG. 3 is a block diagram illustrating an embodiment of a priority control unit 204 of the memory 102A shown in FIG. 2.

Furthermore, a configuration of a priority control unit in the memory 102A shown in FIG. 2 is shown in FIG. 3.

In the packet switching system shown in FIG. 1, a plurality of terminals 110a 110n are accommodated in the packet exchange 100A, and the packet exchange 100A is connected to another packet exchange 100B via a trunk 120.

Here, a plurality of terminals 111a 111n are also accommodated in the packet exchange 100B.

It is assumed that a communication request has been made from the terminal 110n to the terminal 111n in this system.

In this case, prior to that communication, a call message is delivered from the terminal 110n to a control unit 101A in the exchange 100A via a call signal line 105A.

Here, the control unit 101A conducts control which will be described later, secures a communication path, a communication channel, and the like between the terminal 110n and the terminal 111n, and delivers a call message to the adjacent exchange 100B via a call signal line 121 in a trunk 120 in accordance with path information provided for each preset destination. Meanwhile, a control unit 101B secures a communication path and a channel up to the destination terminal 111n, and delivers a call message to the terminal 111n via a call signal line 105B.

Subsequently, when conducting packet communication between the terminals 110n and 111n, a packet is transmitted from the terminal 110n to the memory 102A of the packet exchange 100A via a data line 106A, and the packet is transmitted to, for instance, a trunk interface 103A in accordance with the communication path set by the call message. Packets are then continued to be transmitted from a trunk interface 103B of the opposed packet exchange 100B to the terminal 111n through a memory 102B via a data line 106B.

Figure 15:
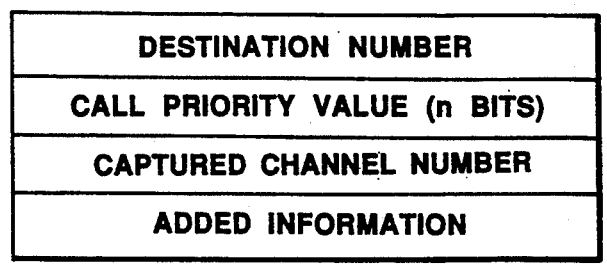
FIG. 15 is a diagram illustrating an example of a format of a call message used in call setting processing of a switching system of this type.

In the packet switching system in accordance with the present invention, a call message having a format such as the one shown in FIG. 15 is employed as in a conventional system.

Namely, this call message comprises destination number information expressed by a destination exchange number and a destination terminal number; a call priority value (n bits) expressing a communication priority value between the terminals; a channel number captured for a terminal line and a trunk conforming with information on a path to a destination number of the packet transmitting side; and other additional information expressing communication attributes and the like of a terminal.

Figure 4:
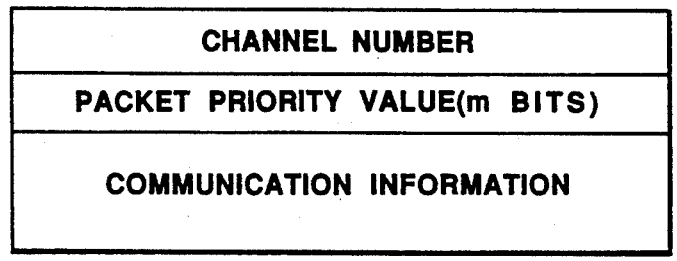
FIG. 4 is a diagram illustrating an example of a format of a communication packet subject to priority control in accordance with the present invention.

In contrast, a communication packet used in the packet switching system in accordance with the present invention has a novel format configuration such as the one shown in FIG. 4.

Figure 16:
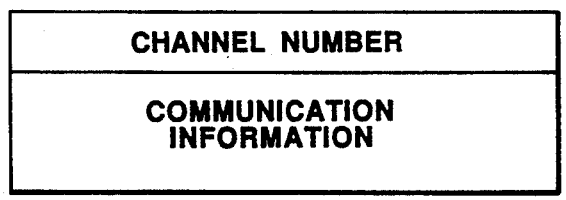
FIG. 16 is a diagram illustrating an example of a format of a communication packet subject to conventional priority control of this type.

A conventional communication packet comprises an expression of a channel number captured at the time of call setting and an expression of communication information of a terminal, as shown in FIG. 16, but in the communication packet in accordance with the present invention, a field for storing a packet priority is provided by an m-bit portion in the frame of a communication packet between terminals and is used, jointly with a call priority, for priority control.

The reason for effecting priority control by the joint use of the packet priority and the call priority is that if an attempt is made to effect the priority control only with the field provided in each packet, the use of a large capacity of field (m bits) is unavoidable, and the overhead of the packets used intermittently as a communication means between terminals hence becomes disadvantageously large. For this reason, this measure is adopted to prevent this situation from occurring.

Figure 5:
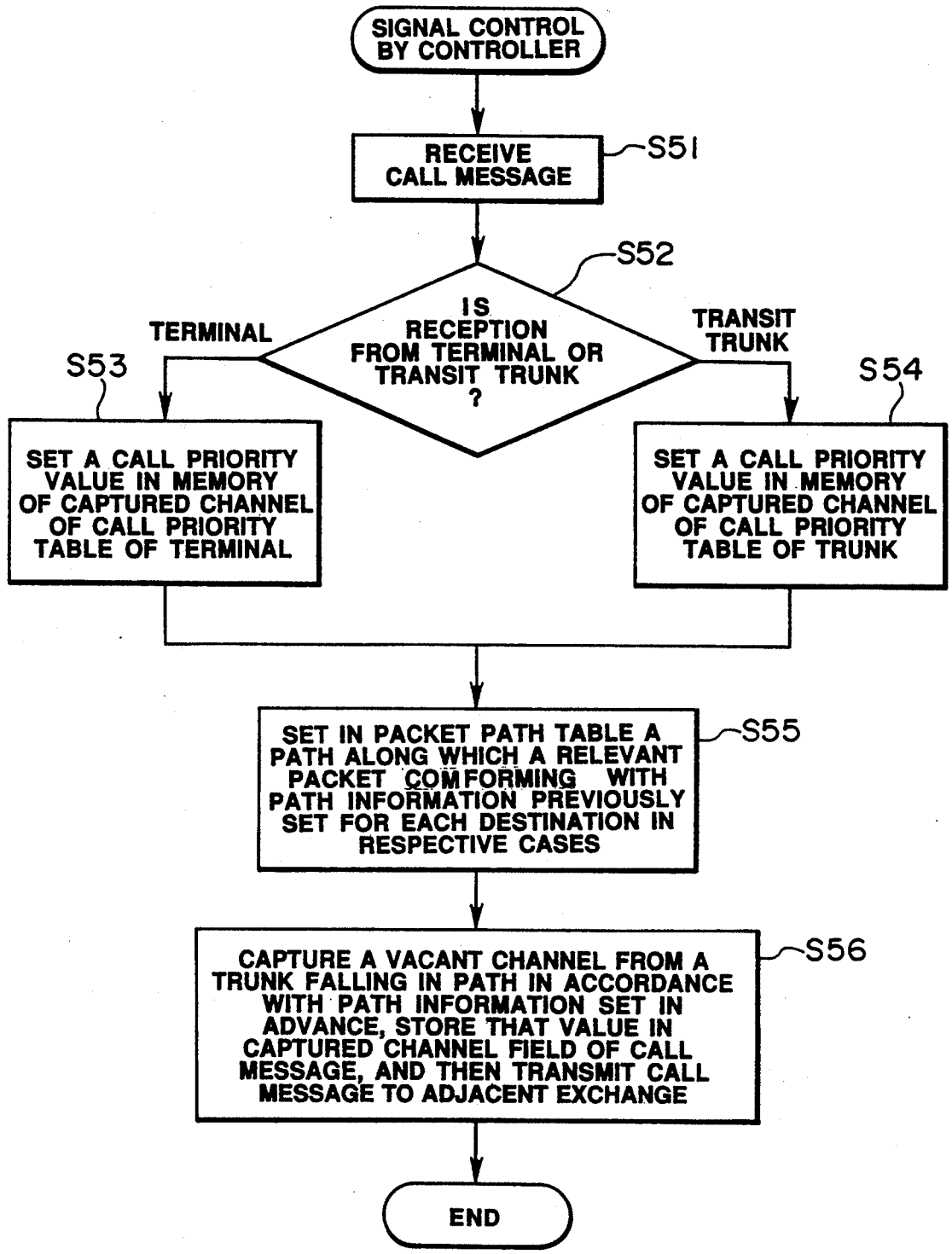
FIG. 5 is a flowchart illustrating a processing operation at a time of reception of a call message by a control unit of the packet exchange in accordance with the present invention.

In the packet switching system of FIG. 1 for handling the aforementioned call message and communication packet, an example of a processing operation at a time when a control unit 101 of each packet exchange 100 has received a call message is shown in the flowchart of FIG. 5.

In FIG. 5, upon receiving a call message (S51), the control unit of each exchange determines whether it is reception from a terminal or reception from a transit trunk (S52).

Here, if it is reception from a terminal, a call priority value in the call message is written in a storage area for a captured channel value in the call message in a relevant terminal number area of a call priority table which will be described later (S53).

On the other hand, if it is reception from a transit trunk, a call priority value in the call message is written in a storage area for the captured channel value in the call message, the storage area belonging to a relevant trunk number area in the call priority table (S54).

Subsequently, a path where packets due to that call conforming with the information on a path to the destination number is written in a path information section of a packet path table (S55).

Furthermore, by capturing a vacant channel from a trunk or terminal being presented as path information, its channel value is stored in a channel information section of a packet table and a captured channel field in the call message, and a call message is then transmitted to an exchange adjacent in terms of the path information (S56).

If this processing is repeatedly executed from a beginning terminal to an ending terminal, the packet path and the priority of that call is set.

Next, a description will be given of an outline of the operation of packet communication processing in the packet switching system shown in FIG. 1.

In the packet switching system of FIG. 1, the exchanges 100A, 100B on the packet communication path have as their memories 102A, 102B those having a configuration shown in FIG. 2, respectively.

In particular, FIG. 2 takes as an example a configuration of the memory 102A of the packet exchange 100A.

In this memory 102A, a call priority for each channel which is set at the time of the above-described call setting (see FIG. 5) as well as a trunk number and a terminal number of the packet and a communication channel number which are to be sent are set in the priority control unit 204 and a packet path table 205, respectively.

Then, when the packet is received through a reception data line 1061, this reception packet is sent to the priority control unit 204 via a packet receiving unit 202.

Subsequently, this reception packet is temporarily stored in a buffer 207 via a buffer address bus 2041A and a buffer data bus 2042A.

At this time, when the buffer 207 is full, a busy detecting unit 208 makes a busy signal S3 active and notifies the priority control unit 204 to that effect.

At the same time as this operation, an in-buffer lowest priority value and a vacant packet address (or packet address) are delivered from specific value storage areas 2071 and 2072 in the buffer 207 to the priority control unit 204 by using an in-buffer lowest priority signal S2 and a vacant buffer address signal S1, respectively.

Meanwhile, when the buffer 207 is not full, the busy signal S3 becomes nonactive.

At the same time as this operation, a relevant vacant packet address is set at 2072 in the buffer 207, and is delivered to the priority control unit 204 by means of the vacant buffer address signal S1.

Then, by virtue of the specific control processing of the priority control unit 204 which will be described later, when the buffer 207 is not full, the reception packet is stored in a storage area designated by the vacant buffer address signal S1, a control priority value (determined by a call priority value and a packet priority value) concerning the communication of that reception packet is delivered to the priority control unit 204 via a priority notification signal S6.

Meanwhile, when the buffer 207 is full, this reception packet is abandoned only when the control priority value of the reception packet is smaller than or equal to the in. buffer lowest priority value.

On the other hand, when the control priority value of the reception packet is greater than the in-buffer lowest priority value, the reception packet is stored in the storage area designated by the vacant buffer address signal S1 in correspondence with this in-buffer lowest priority value, and the control priority value of that reception packet is delivered to the priority control unit 204 by means of the priority notification signal S6.

When the buffer 207 is busy at that timing, the busy signal S3 is made active, the control priority value of the lowest priority and its buffer address are set at 2071 and 2072 in the buffer 207.

When the buffer 207 is not busy, the busy signal S3 is made nonactive, and a vacant buffer address is set at 2072 in the buffer 207.

Then, at a timing when a transmission data line 1062 has become vacant, packets are fetched consecutively from the buffer 207, a terminal number or a trunk number of a corresponding path are added to the fetched packet in the packet Rx bus, a communication channel number corresponding to that packet on the packet Rx bus is written in a channel number field of the packet before the packet is transmitted to the transmission data line 1062 from a packet transmission unit 203 via the packet Tx bus.

For a more detailed description of such priority control of communication packets, FIG. 3 shows a block diagram of a configuration of the priority control unit 204 in the memory 102A shown in FIG. 2.

In this priority control unit 204, when a packet is received from the packet Rx bus connected to the packet receiving unit 202, a packet priority signal S11 and a channel number signal S12 are extracted from the reception packet by means of a packet disassembly unit 301A.

Superposed on the channel number signal S12 of these signals are a receiving terminal number of the reception packet or a reception trunk and a channel number, which are transferred to the call priority table 302.

In addition, superposed on the packet priority signal S11 is a packet priority value which is indicated by a certain field in the packet, and this packet priority value is delivered to a control priority calculator 303 constituted by, for instance, an adder.

It should be noted that this control priority calculator 303 can be realized by a subtractor in addition to the aforementioned adder.

During the aforementioned reception of the packet, the reception packet itself is sent to a data bus switch 309 via a data bus 3011.

Figures 6, 7:
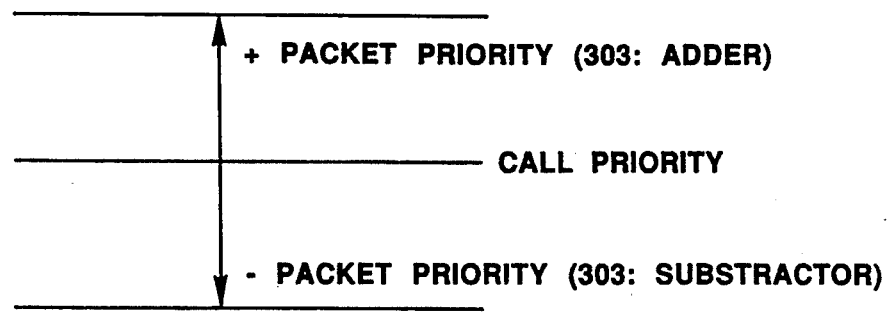
FIG. 6 is a diagram illustrating an example of a stored content of a call priority table 302 in the priority control unit 204 shown in FIG. 3.
FIG. 7 is a diagram illustrating the range of priorities which packets of each channel can assume by the priority control of communication packets in accordance with the present invention.

At this time, a call priority value (n bits) corresponding to each channel, as shown in FIG. 6, is set for each terminal and trunk by the aforementioned call setting processing which is conducted prior to the inputting the channel number signal S12 is set in the call priority table 302 to which the channel number signal S12 is inputted.

On the basis of this setting, in the call priority table 302, a call priority value corresponding to the reception packet is retrieved while referring to the channel number signal S12 from a packet disassembly unit 301 when the signal S12 is inputted, and its result is notified to the control priority calculator 303 by means of the call priority signal S13.

Here, the control priority calculator 303 adds the call priority signal S13 from the call priority table 302 to the packet priority signal S11 from the packet disassembly unit 301, and inputs its result to a comparator 304 as a control priority signal S14.

Here, in the case of a configuration in which the subtractor is used as the control priority calculator 303 instead of the adder, the control priority calculator 303 subtracts the packet priority signal S11 from the call priority signal S13, and inputs its result to the comparator 304 as the control priority signal S14.

Subsequently, the comparator makes a comparison between the control priority signal S14 of the reception packet and the in-buffer lowest priority signal S2, and when S14≧S2 holds, its output S15 is made active.

If the busy signal S3 also becomes active in this state, i.e., when the buffer 207 is busy and the control priority of the reception packet is more than the in-buffer lowest priority, an output S16 of an AND gate 305 in an ensuing stage becomes active, and this output S16 is inputted to an OR gate 307 in a final stage.

An output S18 of this OR gate 307 becomes active when the buffer 207 is not busy or when the output S16 of the AND gate 305 is active.

In addition, an address bus switch 308, the data bus switch 309, and a priority notification switch 310 that are provided in the priority control unit 204 in such a manner as to be interposed before the buffer 207 are respectively controlled in such a manner that their contacts are closed when the output S18 of the of the OR gate 307 is active.

Accordingly, when the buffer 207 is not busy or the output 16 of the AND gate 305 is active, the address bus switch 308, the data bus switch 309, the priority notification switch 310 are closed on the basis of the output S18 of the OR gate 307 at this time, the reception packets are consecutively accumulated in the buffer 207 through the buffer address buss 2041A and the buffer data bus 2042A.

Thus, in the priority control of communication packets in accordance with the present invention, priority control is not conducted only by the call priority value of the packet which is set as a fixed value at the time of call setting, but the packet priority value is further added to that call priority value, and priority control is effected in accordance with a control priority value calculated on the basis of the relationship between these two values.

For this reason, even in cases where information which is relatively important and information which is not so as communication information between terminals are present in a mixed state, it is possible to have that effect reflected on the control priority value while being notified by being carried by certain field information of a communication packet. As a result, it is possible to realize efficient packet communication corresponding to the importance of the packet being communicated even during communication.

FIG. 7 conceptually illustrates a variable range of the control priority used in the priority control of communication packets in accordance with the present invention.

According to this concept, in cases where the control priority calculator 303 is constituted by, for instance, an adder, the control priority value of the communication packet between terminals can be varied even during call connection within a range from a call priority value to a "call priority plus packet priority" value (0-2).

Accordingly, if packets are sent from a terminal by setting a high packet priority value to communication information which is important and by setting a low packet priority value to communication which is not very important, communication information having a high priority can be communicated preferentially within an exchange even in communication by the same call between terminals.

Similarly, in cases where the control priority calculator 303 is constituted by a subtractor, the control priority value can be varied within a range from a call priority value to a "call priority minus packet priority" value, whereby effects similar to the case where an adder is used can be expected.

Figure 8:
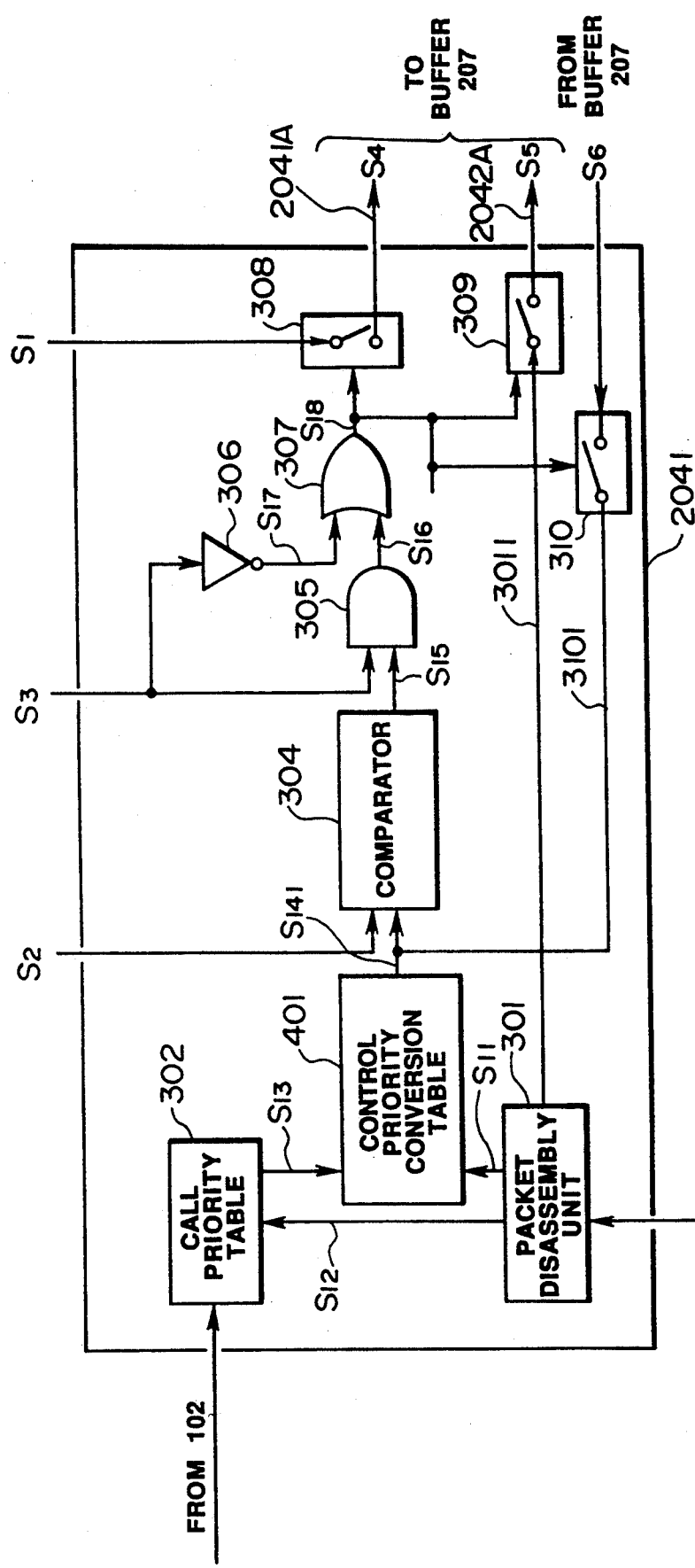
FIGS. 8 and 9 are block diagrams illustrating another embodiment of the priority control unit 204 in the memory 102A shown in FIG. 2, respectively.

As another embodiment of the present invention for realizing such variable control of the priority of communication packets, a configuration of a priority control unit 2041 shown in FIG. 8 is also conceivable.

This priority control unit 2041 differs from the priority control unit 204 shown in FIG. 3 in that a control priority conversion table 401 is provided instead of the adder or subtractor as a control priority setting means.

Here, a brief description will be given of points of difference in configuration between the priority control unit 2041 and the priority control unit 204.

Referring to FIG. 8, control priority data having various values corresponding to the relationship between the packet priority signal S11 inputted from the packet disassembly unit 301 at the time of packet reception and the call priority signal S13 inputted from the call priority table 302 are registered in advance in the control priority conversion table 401.

Then, in an actual packet receiving operation, the control priority conversion table 401 selects variable priority data of a value corresponding to the relationship between the packet priority signal S11 and the call priority signal S13 that are inputted from the packet disassembly unit 301 and the call priority table 302 at that time. The control priority conversion table 401 then outputs that variable priority data to the comparator 304 as a control priority signal 141.

The subsequent priority control of communication packets on the basis of this control priority signal S141 is similar to that of the priority control unit 204 shown in FIG. 3.

In the case of this embodiment, control for setting the priority can be more simplified than in cases where an adder or a subtractor is used as the control priority setting means.

Figure 9:
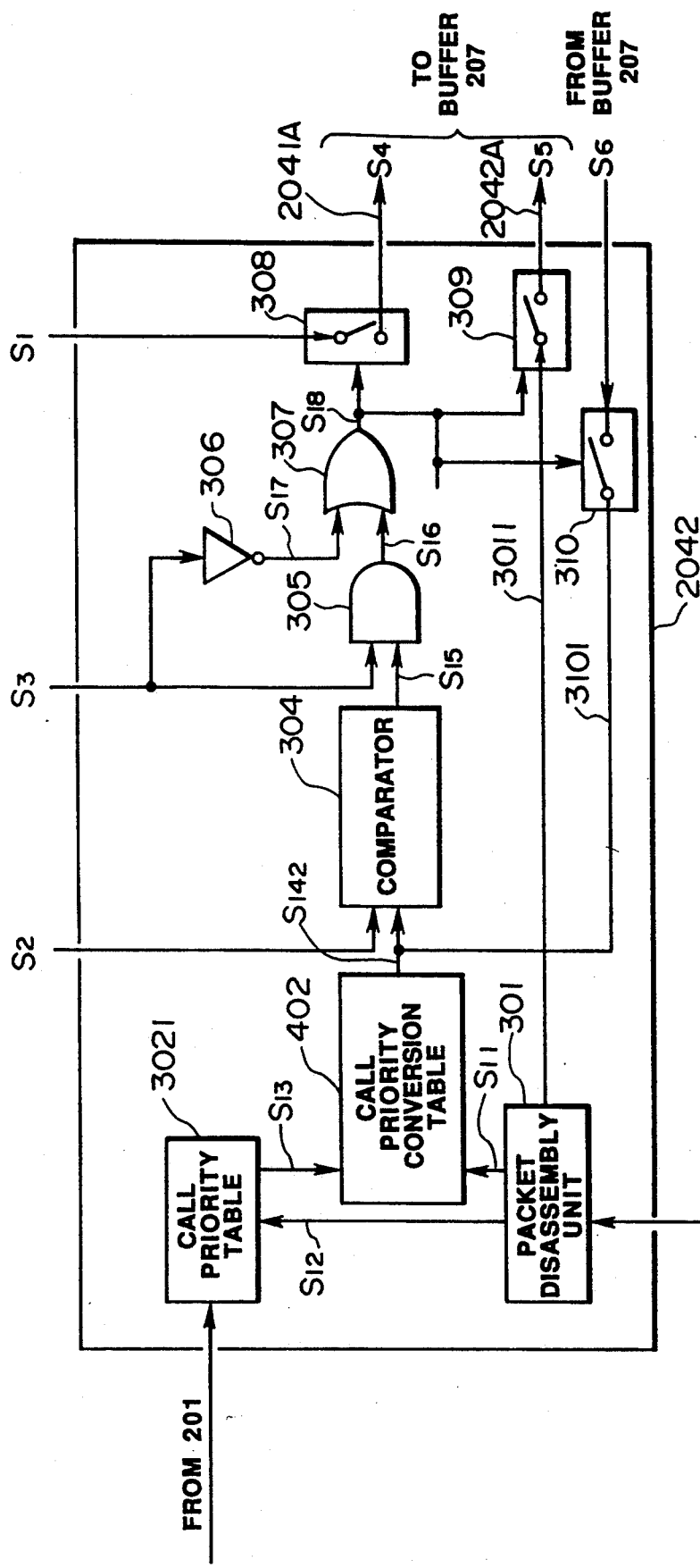

Furthermore, as still another embodiment of the present invention, the priority control unit can be configured as shown in FIG. 9.

This priority control unit 2042 selectively outputs any one of a plurality of different call priorities prepared for a call, in correspondence with the packet priority of the reception packet, and handles the relevant outputted call priority as the control priority so as to effect packet priority control.

To realize such control, the priority control unit 2042 is provided with the call priority value conversion table 402 in substitution for the adder or subtractor.

In addition, the priority control unit 2042 is provided with a call priority table 3021 for discretely setting a plurality of different call priority values with respect to a call in the manner shown in FIG. 10, in connection processing at the time of call setting.

With respect to an exchange having the priority control unit 2042 thus arranged, the terminal at the transmitting side, at the time of calling, discretely requests the manner of setting a call priority value in the call message in the form of Px, Py, Pz . . .

Then, the exchange which has received that call message sets the discrete values Px, Py, Pz . . . in the call priority table 3021 of the priority control unit 2042 as call priority values for each captured channel of the call receiving terminal or trunk (see FIG. 10).

Subsequently, when a packet is received, the priority control unit 2042 transfers to the call priority value conversion table 402 the discrete priority values Px, Py, Pz set in the call priority table 3021 at the time of setting a call corresponding to that packet.

Meanwhile, at the time of the aforementioned packet reception, the packet priority signal S11 extracted from that reception packet by the packet disassembly unit 301 is immediately inputted to the call priority value conversion table 402.

At this time, the content of the data of the call priority value conversion table 402 assumes a form such as the one shown in FIG. 11.

Here, the call priority value conversion table 402 retrieves a call priority value corresponding to the packet priority signal S11 of the reception packet at that time among the discrete call priority values Px, Py, Pz . . . already transferred from the call priority table 3021, and outputs the same to the comparator 304 as a control priority signal S142.

Subsequently, the manner of priority control of reception packets conducted on the basis of this control priority signal S142 is similar to the above-described examples.

Thus, the priority control is effected while call priority values corresponding to the packet priorities of the reception packets are being selectively outputted from among the call priority values discretely set for one call, and are being used as control priority values. Hence, even if items of information which have extremely high priorities and those which do not have very high priorities are mixed among items of communication information between terminals, it becomes possible to effect priority control as intended by the present invention without securing a large range of priorities within the exchange, i.e., without providing a large packet priority field.

It should be noted that although in the above-described embodiments the packet priority values are varied in correspondence with the degree of importance of each packet transmitted from the terminal, an arrangement may be alternatively provided such that the priorities of packets are variably set inside the exchange in correspondence with the state of the exchange (i.e., such as when any one of transit trunks is faulty, causing increased occurrences of memory overflow, and when a greater number of packets are being transmitted than a value declared by the terminal).

In addition, in accordance with the present invention, when an attempt is made to set packet priorities within the exchange, it is possible to effect communication by lowering the priorities of those communication packets of a terminal which is in violation of a declared value, or when the congestion of packets has occurred, it is possible to effect communication by lowering the priorities other than communication packets of a terminal registered in advance. Thus, it is possible to flexibly cope with control with an exchange.

If such control is adopted, it is possible, for instance, to restrict the range of priorities of communication packets between terminals to the aforementioned range of variation of the packet priority values, and set an upper limit to the priorities of communication packets between the terminals.

In addition, by the setting of this type of upper limit, when an error has occurred to packet priority information stored in communication packets, it becomes possible to provide protection so that the priority values of communication packets set at that time will not deviate from the upper limit.

In the above, a description has been given mainly of examples in which priority control is effected for the packet switching system among systems of the connection-type communication method.

In addition to the packet switching system, it goes without saying that the present invention is applicable to the asynchronous transmission mode (ATM).

Figure 12:
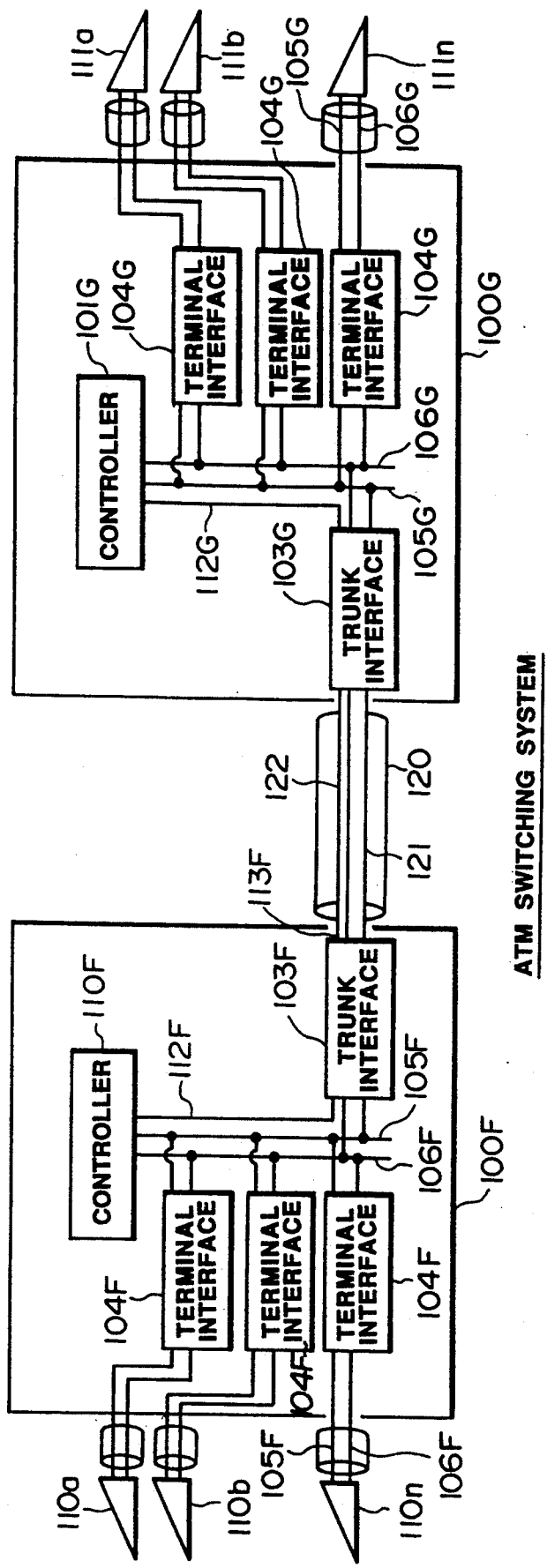
FIG. 12 is a system configuration diagram of an asynchronous-transmission-mode switching system to which the method for controlling the priority of communication packets in accordance with the present invention is applied.

FIG. 12 is a schematic system configuration diagram of an ATM switching system to which the priority control of communication packets in accordance with the present invention is applied.

In FIG. 12, an ATM exchange 100F accommodates terminals 110a–110n, and is connected to another ATM exchange 100G accommodating terminals 111a–111n via a trunk 120.

Here, the ATM exchange 100F comprises a control unit 101F, a terminal interface 104F, and a trunk interface 103F.

Figure 13:
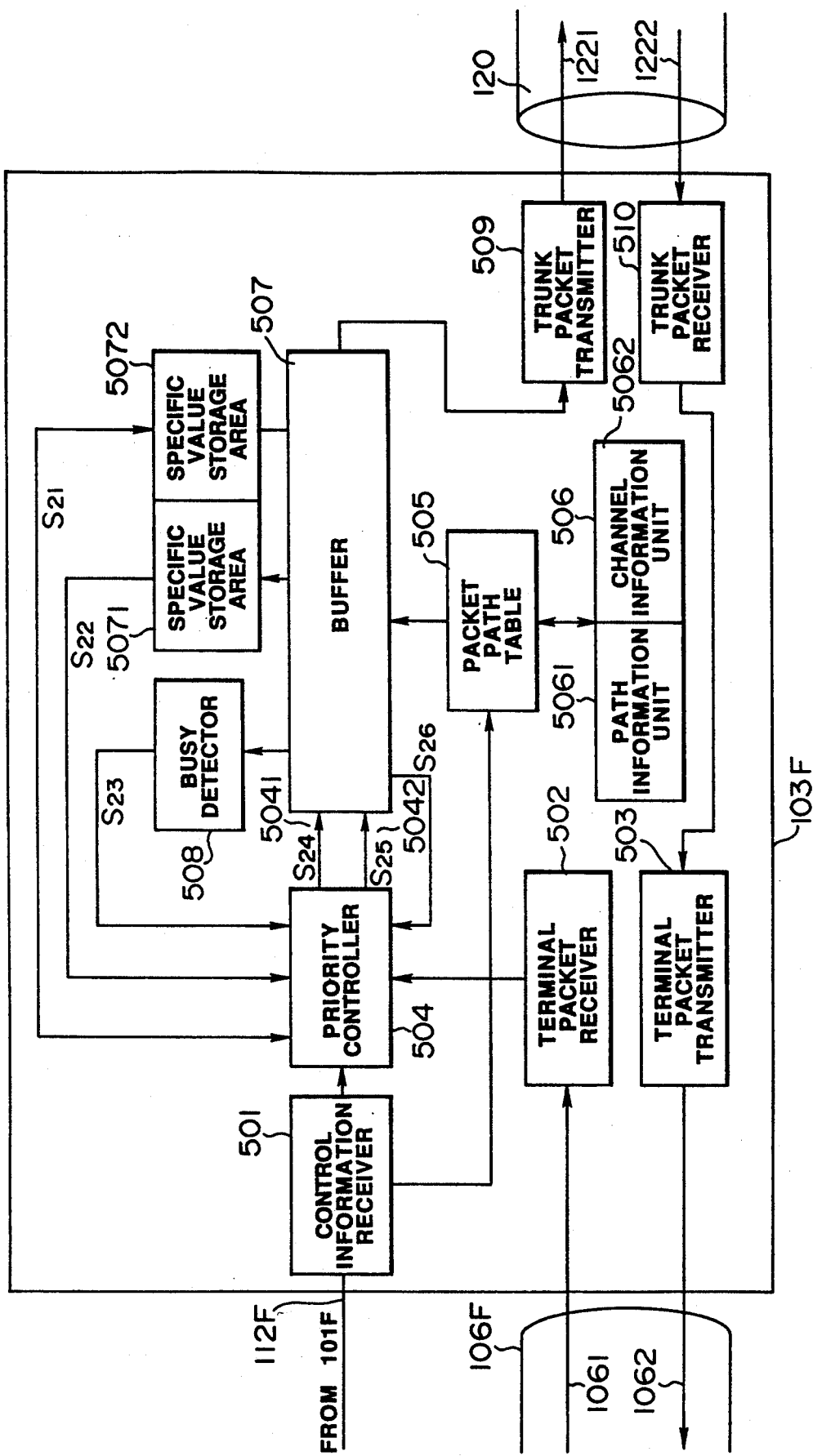
FIG. 13 is a block diagram illustrating a configuration of a trunk interface 103F of an ATM exchange 100F shown in FIG. 12.
Figure 14:
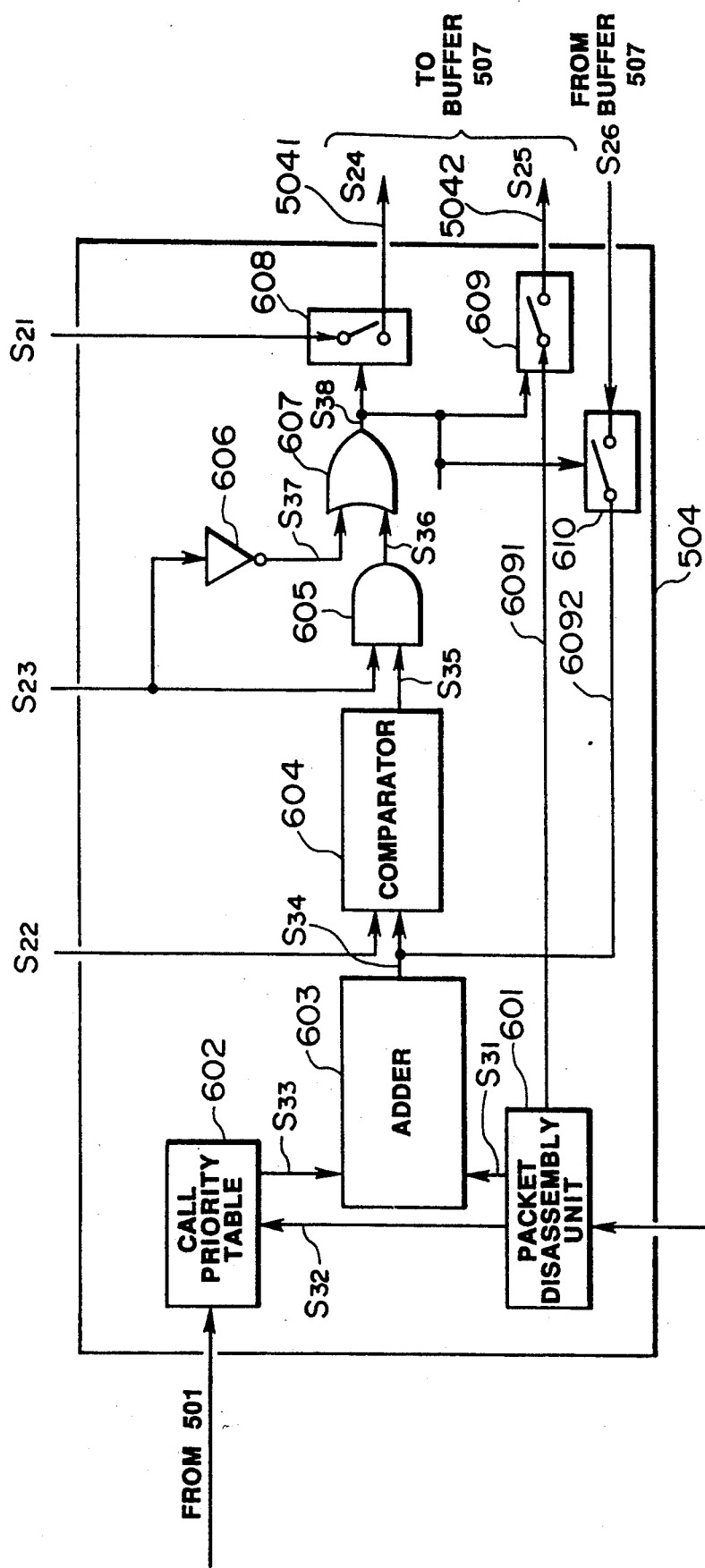
FIG. 14 is a block diagram illustrating an embodiment of a priority control unit 504 in the trunk interface 103F shown in FIG. 13.

The trunk interface 103F is configured as shown in FIG. 13, and a priority control unit 504 among its component is configured as shown in FIG. 14.

The configurations concerning the ATM exchange 100F shown in FIGS. 12–14 are similar with respect to the ATM exchange 100G as well.

In FIG. 12, the ATM exchange 100F differs from the packet exchange 100A in that the ATM exchange 100F does not have the memory 102A as a constituent element within its own facility.

In correspondence with this difference in configuration, the ATM exchange system is provided with the priority control unit 504 which is provided in its trunk interface 103F and is adapted to implement the priority control of communication packets in the ATM exchange 100F (see FIG. 13).

In FIG. 13, the trunk interface 103F of the ATM exchange 100F has a substantially similar configuration to that of the memory 102A of the packet exchange 100A shown in FIG. 2. However, the ATM exchange 100F has its trunk interface 103F directly connected to the trunk 12 via a trunk packet transmitting unit 509 and a trunk packet receiving unit 510.

The priority control unit 504 provided for this trunk interface 103F can be realized by a one similar to the priority control unit 204 provided in the memory 102A of the packet exchange 100A shown in FIG. 2, and its example is shown in FIG. 14.

That is, the priority 504 shown in FIG. 14 is arranged such that an adder 603 is provided immediately preceding a comparator 604 and adds a call priority signal S33 inputted from a call priority table 602 to a packet priority signal S31 inputted from a packet disassembly unit 601, thereby variably setting a final control priority signal S34.

It goes without saying that a subtractor may be used instead of the adder 603 in the priority control unit 503 of this ATM exchange 100F.

In addition, as another embodiment of the priority control unit 504, a table corresponding to the control priority conversion table 401 shown in FIG. 8 or the call priority conversion table 402 shown in FIG. 9 may be used instead of the adder 603.

Thus, the present invention is applicable to not only the packet switching system but also the ATM switching system, in each case the priorities can be reset for each packet during call connection, as required.

Accordingly, the present invention is not governed by priority control based on call priorities that are set in a fixed manner, and is particularly useful when applied to a communication system in which there is a strong tendency that information which is important and information which is not so are mixed as communication information between terminals, e.g., packet communication dealing with voice or images and adapted to conduct communication by effecting hierarchical encoding and by preparing a multiplicity of priority levels.

What is claimed is:

1. A method for controlling a communication priority of communication packets comprising the steps of:
   conducting connection processing for determining in advance a communication path and a communication channel between a calling terminal and a called terminal on the basis of call information from said calling terminal in an exchange interpose in the communication path prior to commencing packet communication;
   setting a call priority value presented in the call information from said calling terminal, said setting being effected with respect to each connection at the time of connection processing;
   setting a packet priority value for each packet being communicated during packet communication;
   setting a control priority value on the basis of the call priority value and the packet priority value; and
   controlling the communication priority of a communication packet on the basis of the control priority value.

2. The method according to claim 1, wherein the packet priority value presents a priority concerning a transmission order or a discard order of packet to be communicated, and the packet priority value during communication can be varied in correspondence with the degree of importance of transmission information from said calling terminal such that the higher packet priority value, the more preferentially said information will be subjected to communication processing between said calling terminal and said called terminal.

3. The method according to claim 1, wherein the step of setting the control priority value is effected so as to variably set the control priority value through addition or subtraction involving the call priority value and the packet priority value.

4. The method according to claim 1, wherein the step of setting the control priority value is effected so as to variably set the control priority value by selectively outputting a priority value corresponding to a relationship between the call priority value of communication information and the packet priority value in actual communication from among a plurality of priority values registered in advance in correspondence with the call priority value and the packet priority value.

5. The method according to claim 1, wherein the step of setting the call priority value sets a plurality of call priority values having discrete values with respect to one call, and the step of setting the control priority value discretely allots control priority values by selecting any one of the discrete call priority values in correspondence with the packet priority value of the packet being communicated.

6. The method according to claim 1, wherein the step of setting the call priority value variably set the control priority value on the basis of the call priority value and the packet priority value, and sets an upper limit to the control priority value by restricting a range of variation of the control priority value in correspondence with a range of variation of the packet priority value.

7. The method according to claim 1, wherein the step of setting the control priority value includes a step of variably setting the control priority value on the basis of the call priority value and the packet priority value, a step of setting an upper limit to the control priority value, and a step of providing protection so that, when an error has occurred an information indicating the packet priority value in the communication packet, the control priority value for said communication packet will not exceed the upper limit.

8. An exchange, comprising:
 connection processing means for determining in advance a communication path and a communication channel between a calling terminal and a called terminal on the basis of call information from said calling terminal prior to commencing packet communication;
 call priority value setting means for setting a call priority value presented in the call information from said calling terminal which is used for connection processing in said connection processing means, said setting being effected with respect to each connection;
 packet priority value extracting means for extracting from packets transmitted form said calling terminal, a packet priority value for each packet during packet communication through the communication path and the communication channel determined in said connection processing means, the packet priority value being able to be attached to the packets transmitted from said calling terminal and being able to be varied;
 control priority value setting means for setting a control priority value concerning a communication priority of the communication packet on the basis of the call priority value set by said call priority setting means and the packet priority value extracted by said packet priority extracting means; and
 priority controlling means for controlling a transmission order and a discard order of communication information between said calling terminal and said called terminal on the basis of the control priority value set by said control priority value setting means.

9. The exchange according to claim 8, wherein said exchange comprises a packet exchange.

10. The exchange according to claim 8, wherein said exchange comprises a packet exchange, and said call priority value setting means, said packet priority value extracting means, said control priority value setting means, and said priority controlling means are provided in a memory of said packet exchange.

11. The exchange according to claim 8, wherein said exchange comprises an asynchronous-transmission-mode exchange.

12. The exchange according to claim 8, wherein said exchange comprises an asynchronous-transmission-mode exchange, and said call priority value setting means, said packet priority value extracting means, said control priority value setting means, and said priority controlling means are provided in a terminal interface of said asynchronous-transmission-mode exchange.

13. The exchange according to claim 8, wherein said control priority value setting means comprises a circuit for conducting an addition or subtraction with respect to the call priority value and the packet priority value.

14. The exchange according to claim 8, wherein said control priority value setting means comprises a control priority value conversion table for selecting and outputting from among a plurality of control priority values being registered in advance a control priority value corresponding to a combination of the call priority value and the packet priority value inputted from said calling terminal.

15. The exchange according to claim 8, wherein said control priority value setting means comprises a call priority value conversion table for selecting and outputting any one of a plurality of call priority values having discrete values as the control priority value in correspondence with the packet priority value of the packet being communicated.

* * * * *

UNITED STATES PATENT AND TRADEMARK OFFICE
CERTIFICATE OF CORRECTION

PATENT NO. : 5,208,805
DATED : May 04, 1993
INVENTOR(S) : Tamiya Ochiai

It is certified that error appears in the above-indentified patent and that said Letters Patent is hereby corrected as shown below:

* Claim 13, column 18, line 36, before "addition" delete --an--.

Claim 14, column 18, line 43, after "advance" insert --,--.

Signed and Sealed this

Seventeenth Day of May, 1994

Attest:

BRUCE LEHMAN

Attesting Officer    Commissioner of Patents and Trademarks